R. Jones,
Manf. White Lead.
No. 95,484.   Patented Oct. 5, 1869.

Sectional views

Witnesses.                                   Inventor.

United States Patent Office.

RICHARD JONES, OF MOUNT HOLLY, NEW JERSEY.

IMPROVEMENT IN THE MANUFACTURE OF WHITE OXIDE OF ZINC.

Specification forming part of Letters Patent No. 95,484, dated October 5, 1869.

*To all whom it may concern:*

Be it known that I, RICHARD JONES, of Mount Holly, Burlington county, New Jersey, have invented a new and useful Improvement in the Manufacture of White Oxide of Zinc; and I do hereby declare the following to be a full, clear, and exact description of the same, reference being had to the annexed drawings, in which—

Figure 1:
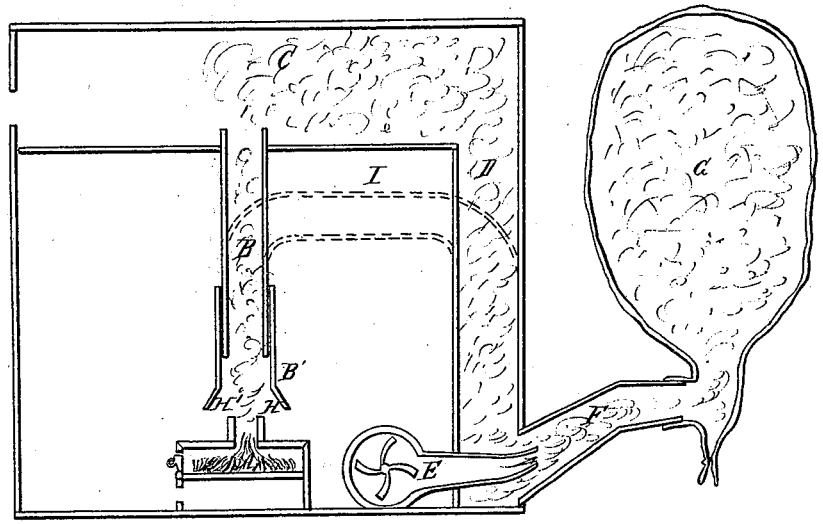
Figure 2:
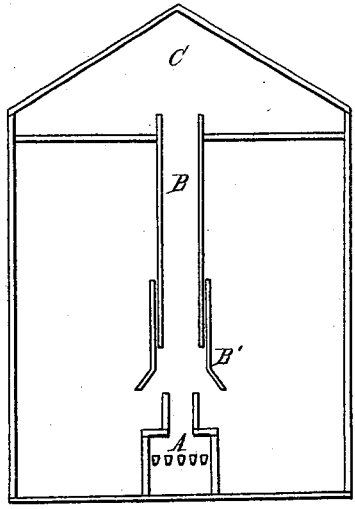

Figure 1 represents a longitudinal vertical section of one form of apparatus for carrying out my invention. Fig. 2 is a vertical cross-section of the same.

The object of my invention is to effect the cooling of the gaseous products of the furnaces before such products enter the collecting-chambers, and thus much retard the destruction of the cloth of which the said chambers are principally composed.

My invention consists in supplying atmospheric air freely to the products aforesaid after complete oxidation of the zinc has taken place and before said products enter the collecting-chambers.

In the application of my invention the oxidation of the zinc vapors takes place in the usual manner—viz., either wholly in the furnaces or partially there and partially in the flues immediately adjacent to the furnaces. The introduction of atmospheric air into said vapors before their complete oxidation has taken place only serves to increase the flame, and thus to increase the heat of the vapors. After the complete oxidation of the zinc vapors I allow the whole products of combustion to mix freely with atmospheric air, and I thus cool them preparatory to their entry into the collecting chamber or chambers.

In the drawings, let A represent any furnace for the manufacture of the oxide of zinc; B, the ascending pipe or flue, it being provided with the regulating slide or collar B. The pipe B leads into the cooling-chamber C.

D is a passage forming part of the cooling-chamber.

The gaseous products of the furnace A are drawn down through passage D to fill the partial vacuum formed by the action of the current of air from the blower E, and are forced through passage F into the collecting-chamber G by means of said current.

In the form of apparatus shown the required amount of atmospheric air is admitted through the opening H, and the supply is regulated by raising or lowering the collar B; or the air might be admitted through any number of ventilating-holes formed in the wall of chamber C, or by any number of such holes made in the chambers or passages anywhere between the point of complete oxidation of the vapors and the collecting-chambers.

Instead of arranging the blower as represented, it may be placed in the passage D, as is commonly done; or the draft necessary to draw and force the vapors into the collecting-chambers may be produced in any desired manner.

Instead of causing the vapors to pass into a cooling-chamber, C, as shown, a chamber or passage, I, indicated in red lines in Fig. 1, leading more directly into the collecting-chambers, may be employed, and in the latter case the blower should be arranged in the manner shown in Fig. 1, for the double purpose of creating a draft and supplying atmospheric air to the vapors.

My invention may be applied to works already erected by making holes in their cooling-chambers for the admission of atmospheric air before the vapors are passed through the blower.

I am aware that through holes made near the furnaces in the flues or pipes which connect the furnaces with the collecting-rooms atmospheric air has been supplied to the products of combustion sufficient to complete the oxidation of the zinc vapors. This I do not claim; but What I do claim, and desire to secure by Letters Patent, is—

Introducing atmospheric air into the gaseous products of the furnaces after complete oxidation has taken place and before such products enter the collecting-chambers for the purpose of cooling said products, substantially as set forth.

RICHARD JONES.

Witnesses:
GEORGE E. BUCKLEY,
W. A. A. MCKINLEY.